United States Patent [19]

Reyes

[11] 4,227,857
[45] Oct. 14, 1980

[54] COMPOSITE FLEXURAL YOKE FOR HELICOPTERS

[75] Inventor: Peter A. Reyes, Watauga, Tex.

[73] Assignee: Textron, Inc., Providence, R.I.

[21] Appl. No.: 826,111

[22] Filed: Aug. 19, 1977

[51] Int. Cl.² .......................................... B64C 27/36
[52] U.S. Cl. .............................. 416/134 A; 416/141; 416/148; 416/230
[58] Field of Search ......... 416/132 R, 134 A, 138 A, 416/140 A, 141, 102, 148, 230 A; 64/12; 74/579 R, 581

[56] References Cited

U.S. PATENT DOCUMENTS

| | | | |
|---|---|---|---|
| 2,830,669 | 4/1958 | Klockner | 416/102 |
| 3,228,481 | 1/1966 | Eldred | 416/134 A |
| 3,362,252 | 1/1968 | Ditlinger | 416/134 A X |
| 3,362,253 | 1/1968 | Ditlinger | 416/134 A X |
| 3,384,185 | 5/1968 | Fernandez | 416/134 A |
| 3,528,753 | 9/1970 | Dutton et al. | 416/230 A X |
| 3,669,566 | 6/1972 | Bourquardez et al. | 416/134 A |
| 3,713,753 | 1/1973 | Brunsch | 416/230 A X |
| 3,762,835 | 10/1973 | Carlson et al. | 416/230 X |
| 3,807,896 | 4/1974 | Johnson | 416/148 |
| 3,874,815 | 4/1975 | Baskin | 416/141 X |
| 3,880,551 | 4/1975 | Kisovec | 416/141 X |
| 3,967,918 | 7/1976 | Mouille et al. | 416/134 A |
| 4,008,980 | 2/1977 | Noehren et al. | 416/141 X |
| 4,012,169 | 3/1977 | Mouille et al. | 416/134 A |
| 4,038,885 | 8/1977 | Jonda | 416/134 A X |
| 4,047,839 | 9/1977 | Ferris et al. | 416/134 A |
| 4,111,606 | 9/1978 | Prewo | 416/230 R X |

FOREIGN PATENT DOCUMENTS 1586572  2/1970  France .................................. 416/230

Primary Examiner—Everette A. Powell, Jr.
Attorney, Agent, or Firm—Richards, Harris & Medlock

[57] ABSTRACT

A yoke for coupling helicopter blades to a mast is provided. The yoke comprises a long oval loop of glass fibers embedded in a cured adhesive to form a solid strap. The side portions of the loop are reinforced with layers of bias ply glass fibers arranged in parallel planes. Structure is provided to couple to the side portions of the loop for attachment to the mast.

5 Claims, 7 Drawing Figures

COMPOSITE FLEXURAL YOKE FOR HELICOPTERS

BACKGROUND OF THE INVENTION

This invention relates to a yoke for coupling helicopter blades to a mast; and more particularly, the invention relates to a coupling system characterized by a long oval loop of glass fibers embedded in a cured adhesive to form a solid oval loop having side portions which are reinforced for withstanding torque transmitted from the mast to the blades.

Helicopter rotor blades have been coupled by many different structures to a rotating mast for the transfer of torque from a rotor to the blades. Representative of mounting structures for two bladed teetering rotors is the yoke disclosed in U.S. Pat. No. 3,652,185 and a similar yoke disclosed in U.S. Pat. No. 3,804,552. Such yokes are characterized by a flat metal plate oriented generally perpendicular to the axis of the mast and secured through a pivotal mounting to the mast. The plate is resilient so that it forms a virtual hinge to accommodate the flapping forces that may be encountered.

The highly desirable properties of fiber glass, particularly the fatigue strength thereof, and other composite materials makes the use of such materials desirable in enhancing the useful life of helicopter rotor systems where they are subject to high and repeated stresses. The problem of coupling an all composite fiber glass yoke to the mast for transfer of torque has been a significant deterrent to achieving this end. The present invention, however, is directed to a structure which satisfies the operational requirements and provides for the torque transfer in a manner that lends to long yoke life.

SUMMARY OF THE INVENTION

The present invention is directed to a yoke for coupling helicopter blades to a mast. In accordance with this invention, a yoke comprises a long oval loop of glass fibers embedded in a cured adhesive to form a solid strap having opposed reinforced sections centered on the long sides of the oval loop. Preferably layers of bias ply glass fibers are incorporated in each thickened section. Layers are placed in planes which are parallel to the axis of the loop. Torque transmitting structure of the reinforced sections where the reinforcing layers are located provides for the direct transfer of rotational torques from the mast to the yoke. In one embodiment, the invention involves the formation of holes on a common axis perpendicular to the mast axis through the reinforced sections with torque transmitting coupling means including torque transmitting pins passing through the hole to transmit torque from the mast to the yoke.

DESCRIPTION OF THE PREFERRED EMBODIMENTS

Figure 1:
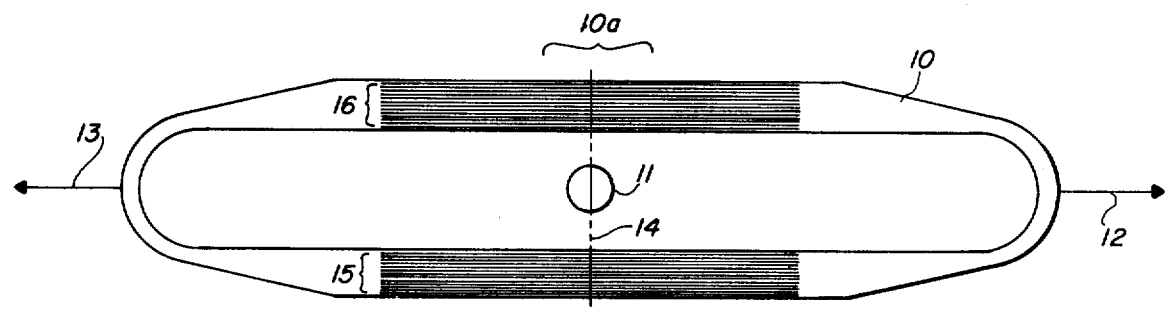
FIG. 1 is a top view of a yoke embodying the present invention shown in its relation to the mast.

Referring now to FIG. 1, a yoke 10 has been illustrated as comprising a long oval loop which has its center coinciding with the axis of a mast 11. The loop 10 is provided, as will hereinafter be described, for coupling the mast 11 to a pair of helicopter blades which extend from the loop in the direction of arrows 12 and 13, and transferring from mast 11 the driving forces necessary to be applied to the blades. In accordance with the present invention the yoke 10 is made entirely of fiberglass embedded in a cured adhesive. However, the structure is of a compound nature. More particularly, the glass fiber is of a continuous nature and extending as continuous threads around the loop and is reinforced with layers of bias ply inserts.

Figure 2:
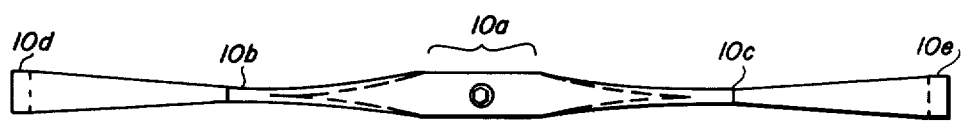
FIG. 2 is a side view of the yoke of FIG. 1.

As best shown in FIG. 2, the yoke preferably has thickened center sections 10a with thinned intermediate sections 10b, 10c and end sections 10d, 10e that are thickened vertically but thin radially.

As shown in FIG. 1, opposed sections 10a are located on the long side portions of the yoke 10 and are symmetrical to an axis 14 which passes through the axis of the mast 11. The center sections 10a are further characterized by having integrated therein stacks of cross ply glass fiber panels 15 and 16.

Figure 3:
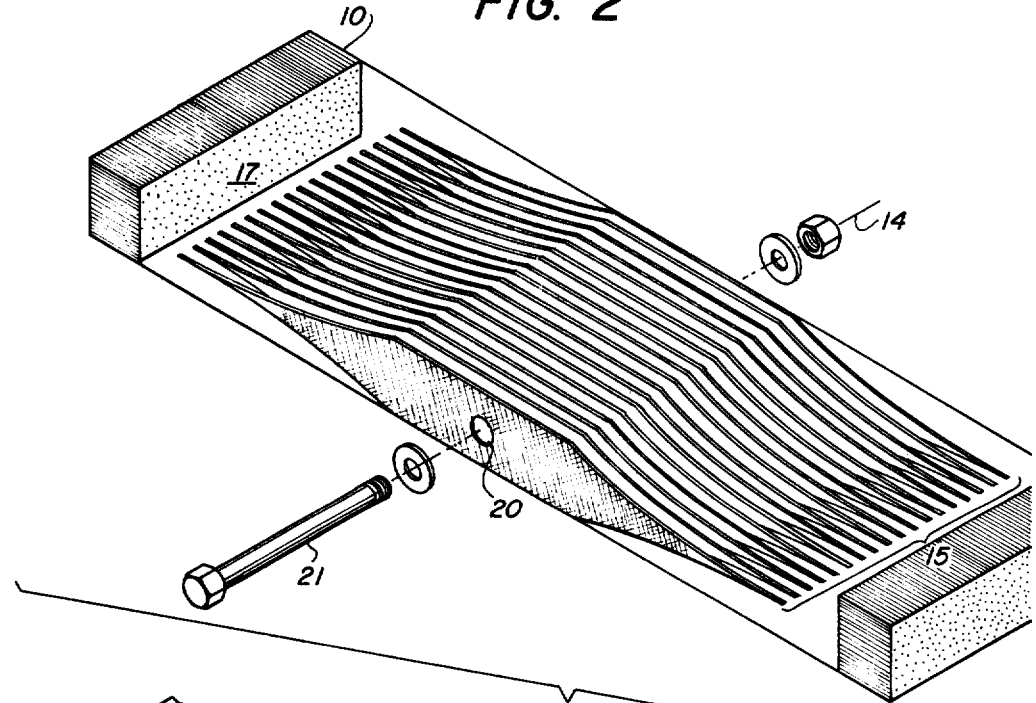
FIG. 3 is an exploded view partially in section of one side of the yoke of FIG. 1.

As best shown in FIG. 3, reinforcing panels 15 are symmetrical to the axis 14 and lie in parallel planes which are perpendicular or normal to the axis 14. They are integrated in the continuous fiber glass rovings that course continuously around the yoke loop. The panels 15 are of fiber glass and are characterized by cross-ply fiber fabric construction. As shown in FIG. 3 there are eighteen reinforcing cross ply panels in the set 15. The portion 17 is included in FIG. 3 to indicate the continuation of the elongated fibers that form the remainder of the loop. The reinforcing panels 15 and 16 are integrated into the loop with the adhesive and the continuous fibers to form a unitary structure.

Figure 4:
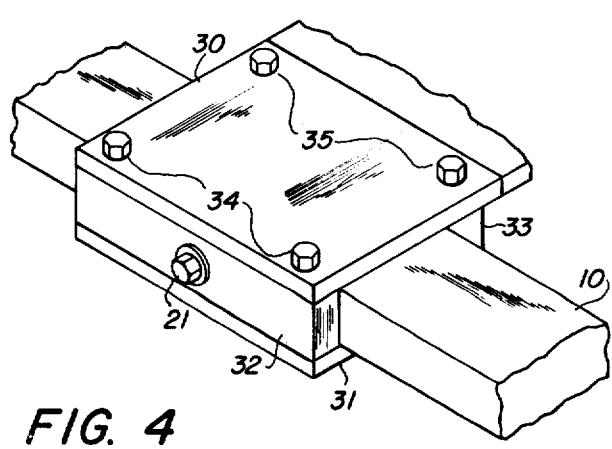
FIG. 4 illustrates a mounting for the side of the yoke shown in FIG. 3.

In one embodiment, a hole 20 is formed through the reinforced sections 10a of the yoke along the line of the axis 14. A torque transmitting pin 21 is provided to pass through the hole 20 and serve to apply the mast torque to the yoke 10. While in FIG. 3 the pin 21 is shown in an exploded view, lying along the axis 14 it will be understood that a suitable clamping structure is provided for the application of the torque forces to the yoke 10. For example, referring to FIG. 4, a suitable clamp is shown for clamping the center section of the yoke at one side thereof and for coupling to the mast. More particularly, a top plate 30 and a bottom plate 31 form structure which is connected to the mast (not shown). Side plates 32 and 33 are secured to the plates 30 and 31 by bolts 34 and 35 respectively. The pin 21 then extends through suitable holes in side plates 32 and 33 and in so doing passes through the enlarged portion of one side of the yoke 10. Mast forces supplied through the plates 30 and 31 through bolts 34 and 35 to side plates 32 and 33 are then applied through pin 21 to the reinforced fiber glass yoke structure.

Figure 5:
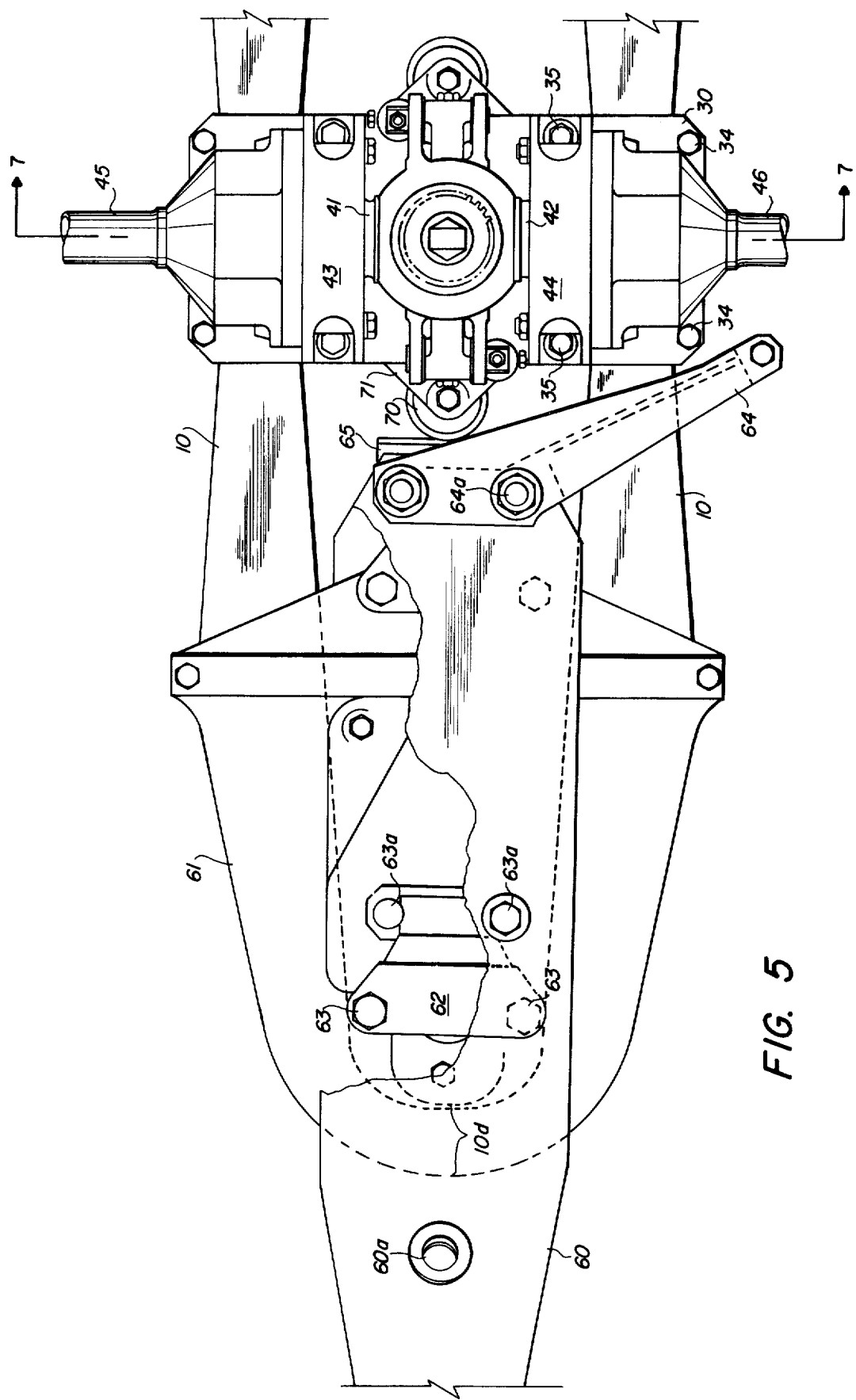
FIG. 5 is a top view of one installation embodying the present invention.

FIG. 5 is a top view of one system in which the yoke of the present invention can be employed. More particularly, mast 11 is secured to a grip coupling structure which incudes trunnions 41 and 42 that form the flapping axis for the rotor system. Blocks 43 and 44 house suitable bearings in which the trunnions 41 and 42 operate. The hub springs 45 and 46 are coaxial with trunnions 41 and 42 and serve to oppose teetering action of the blade relative to trunnions 41 and 42. Located beneath the flapping axis in the upper plate 30 through which the outboard bolts 34 pass and through which inboard bolts 35 pass to clamp the fiber glass yoke. A blade grip 60 is secured to the yoke 10 by means of a clamping structure 61. Centrifugal forces created by rotation of the blades fastened to grip 60 are transferred from grip 60 by way of elastomeric bearing units 62. The bearing unit is mounted by bolts 63 onto the outboard clamping units 61. A pitch horn 64 is provided for controlling the blade pitch through rotation of the grip 60 in the bearing 62 and an inboard bearing 65 relative to the yoke 10 and the clamping unit 61. The yoke in the thin section 10d extends around a suitable bearing structure in the clamping unit 61 through which the outboard portion of the elastomeric bearing is secured by bolts 63. The inboard end of the elastomeric bearing 62 is secured by bolts 63a to the grip structure 60. The rotor blade may then be secured to the grip 60 by pins through holes such as the hole 60a.

It will be apparent that only one blade mounting structure is shown in FIG. 5. It will be understood that identical structure is provided for the second blade the grip for which is not shown in FIG. 5.

Figure 6:
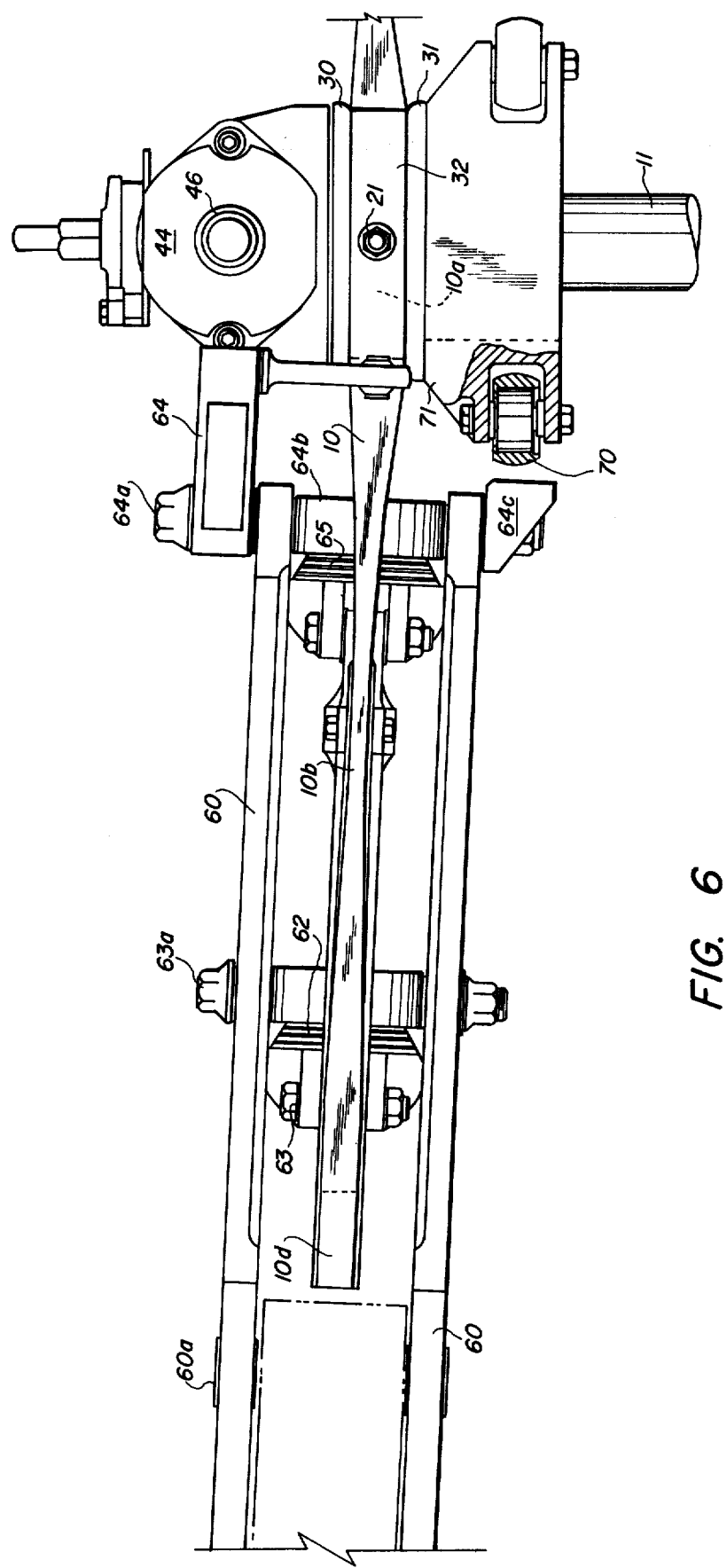
FIG. 6 is a side view of the mounting of FIG. 5.

As best seen in FIG. 5, a blade droop stop roller 70 is mounted by suitable bracket 71 to the yoke clamp structure, as will be better understood by reference to FIG. 6.

Referring to FIG. 6, the thickened center portion 10a of the yoke 10 is clamped between upper plate 30 and lower plate 31 and is located behind the side plate 32 with the bolt 21 extending therethrough. The yoke 10 preferably has a thin section 10b that becomes thicker vertically to form the end loop portion 10d which is fastened in the clamping mechanism. As seen in FIG. 6, the bolts 64a and spacer 64b serve to couple the pitch horn 64 to the inner ends of the grip 60. The lower end of bolt 64a carries a bumper bracket 64c which will engage the bumper stop roller 70 to limit flexure of the yoke 10 in the droop mode.

Figure 7:
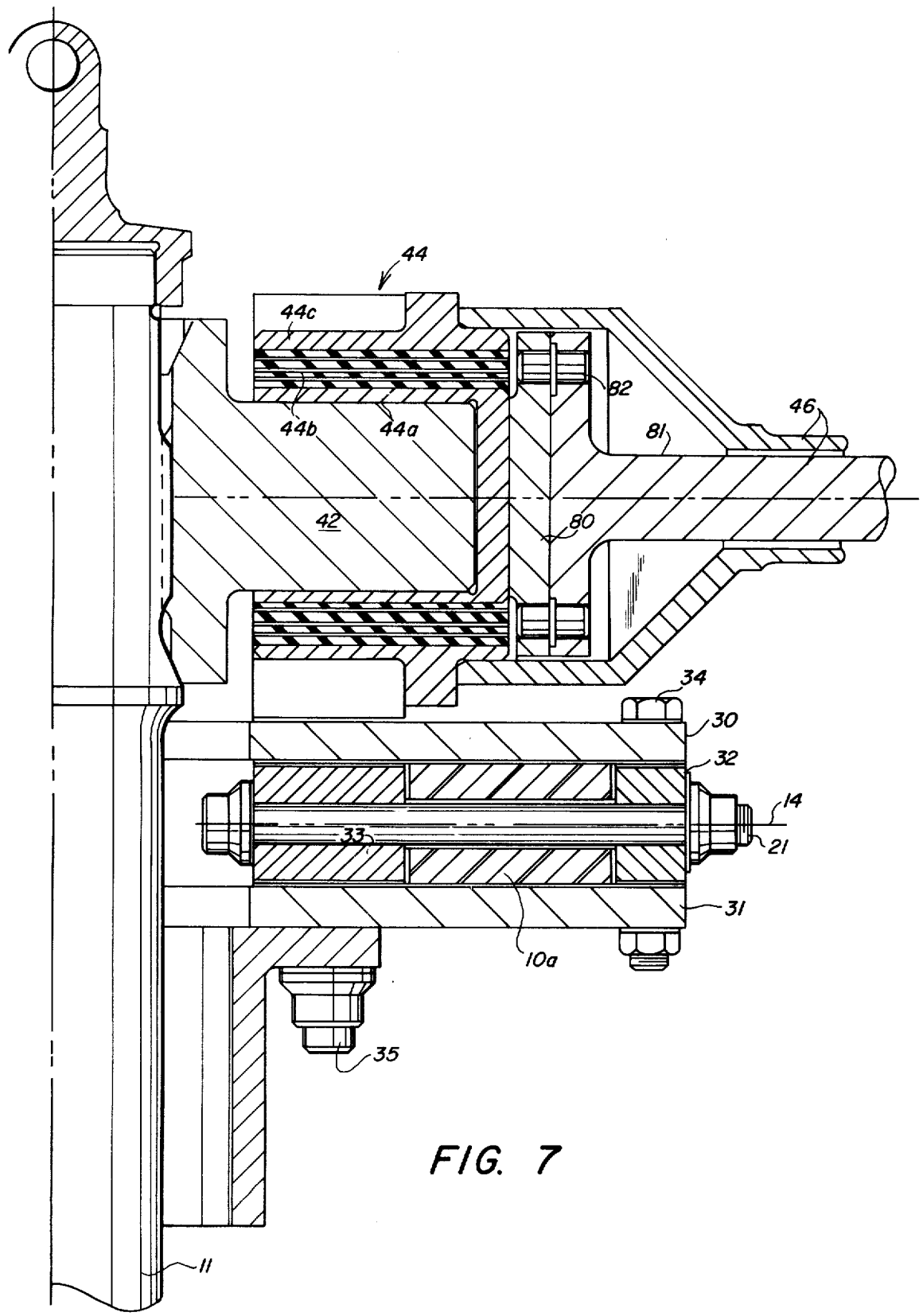
FIG. 7 is a vertical sectional view taken along the line 7-7 of FIG. 5.

FIG. 7 is a vertical section taken along the line 7-7 of FIG. 5 and shows the mounting structure for the yoke 10. The reinforced center portion 10a of the yoke 10 is shown with the bolt 21 passing therethrough and clamped by bolts 34 and 35 between the upper plate 30 and the lower plate 31. The side plates 32 and 33 are also shown in position. Bearing box 44 is shown symmetrical to the axis of the trunnion 42. An inner bearing cylinder 44a is secured to trunnion 42 to be immovable relative thereto. An elastomeric bearing portion 44b formed of alternate cylinders of rubber and thin metal is unified by vulcanization to permit rotation of the outer bearing race 44c relative to the axis of the trunnion 42, and thus form the teetering axis of the rotor system. A fixed plate 80 is secured to the trunnion 42 and is non-movable relative thereto. An inner hub spring shaft 81 is secured by pins 82 to the plate 80. The outer hub spring cylinder 46 is secured to the outer bearing race 44c. The tube 46 and the shaft 81 are secured together at the outer ends thereof (not shown) so that the tube 46 serves as a torsion spring to prevent or oppose flapping on the axis of trunnion 42.

The invention has been described in connection with the foregoing embodiments thereof. It is to be understood that further modifications may now suggest themselves to those skilled in the art. It is intended to cover such modifications as fall within the scope of the appended claims.

What is claimed is:

1. An improved composite all fiberglas yoke for coupling helicopter blades to a rotatable mast, comprising:
   an elongate loop of glass fibers defining a longitudinal axis, with two long sides of the loop extending parallel to the longitudinal axis; and
   a plurality of layers of bias ply glass fibers intersticed between the fibers of said loop of glass fibers and arranged in planes parallel to the longitudinal axis of said loop along said long sides of the loop, said plurality of layers of bias ply glass fibers and said elongate loop of glass fibers being embedded in a cured adhesive to form a unitary structure and defining means for coupling said yoke to said rotatable mast substantially intermediate said two long sides whereby torque is transmitted from the shaft to the yoke intermediate said two long sides.

2. The yoke set forth in claim 1 wherein said means comprises a hole defined through said elongate loop of glass fibers and said plurality of layers of bias ply glass fibers.

3. The yoke set forth in claim 1 which further comprises a clamping structure to be clamped to said long sides of said loop and adapted to be connected to the mast for applying torque force to said loop.

4. The yoke set forth in claim 1 wherein the loop of glass fibers embedded in the adhesive are continuous fiberglas rovings that course around the yoke loop.

5. The yoke set forth in claim 3 wherein said clamping structure comprises a top plate and a bottom plate that extend transverse to said loop with said loop in between, side plates secured to said top and bottom plates to enclose said side loop center portion, and a pin extending through aligned holes in said sides and through the reinforced loop portion.

* * * * *